United States Patent
Szarski et al.

(10) Patent No.: US 12,151,383 B2
(45) Date of Patent: Nov. 26, 2024

(54) ROBOTIC MANUFACTURING SYSTEMS AND METHODS

(71) Applicant: THE BOEING COMPANY, Chicago, IL (US)

(72) Inventors: Martin A. Szarski, Brighton East (AU); Ashkan Amirsadri, Docklands (AU); Leng Vongchanh, Hoppers Crossing (AU)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 17/554,034

(22) Filed: Dec. 17, 2021

(65) Prior Publication Data

US 2022/0241978 A1 Aug. 4, 2022

Related U.S. Application Data

(60) Provisional application No. 63/143,981, filed on Feb. 1, 2021.

(51) Int. Cl.
*B25J 9/16* (2006.01)
*B25J 5/00* (2006.01)
(Continued)

(52) U.S. Cl.
CPC ............ *B25J 9/1697* (2013.01); *B25J 5/007* (2013.01); *B25J 9/1674* (2013.01); *B25J 9/1687* (2013.01);
(Continued)

(58) Field of Classification Search
CPC ........ B25J 9/1697; B25J 5/007; B25J 9/1674; B25J 9/1687; B25J 11/005; B25J 11/008;
(Continued)

(56) References Cited

U.S. PATENT DOCUMENTS 9,132,546 B2 * 9/2015 Matsui .................. B25J 9/1666
9,815,200 B2 * 11/2017 Zimmermann .......... B25J 18/00
(Continued)

FOREIGN PATENT DOCUMENTS

EP 3745224 12/2020
EP 3745224 A1 * 12/2020 ............ B25J 9/1676
(Continued)

OTHER PUBLICATIONS

Machine translation of WO-2006037137-A1 (Year: 2006).*
(Continued)

*Primary Examiner* — Aaron W Carter
*Assistant Examiner* — Courtney Joan Nelson
(74) *Attorney, Agent, or Firm* — Joseph M. Butscher; The Small Patent LAw Group LLC

(57) ABSTRACT

A robotic manufacturing system and method include a robot including a control unit in communication with an operative member. The control unit is configured to operate the operative member in relation to a workpiece within a working area according to a control plan. A presence sensor is configured to detect presence of a human within the working area. An imaging device is configured to acquire an image of at least a portion of the workpiece in response to the presence sensor detecting the presence of the human within the working area.

22 Claims, 5 Drawing Sheets

(51) Int. Cl.
*B25J 11/00* (2006.01)
*G06V 10/74* (2022.01)
*G06V 10/764* (2022.01)

(52) U.S. Cl.
CPC ........... *B25J 11/005* (2013.01); *G06V 10/761* (2022.01); *G06V 10/764* (2022.01); *G06V 2201/06* (2022.01)

(58) Field of Classification Search
CPC ...... B25J 9/1676; B25J 19/021; B25J 9/1656; G06V 10/761; G06V 10/764; G06V 2201/06; G06Q 10/103
See application file for complete search history.

(56) References Cited

U.S. PATENT DOCUMENTS

2016/0271800 A1* 9/2016 Stubbs ................. G05D 1/0214
2018/0232593 A1* 8/2018 Tani ......................... F16P 3/142
2020/0101613 A1 4/2020 Yamada

FOREIGN PATENT DOCUMENTS

| WO | WO-2006037137 A1 | * | 4/2006 | ........... B25J 9/1676 |
| WO | WO-2019014707 A1 | * | 1/2019 | ........... B25J 13/089 |
| WO | WO-2019098429 A1 | * | 5/2019 | ............... F16P 3/14 |
| WO | WO 2019/243796 | | 12/2019 | |
| WO | WO-2019243796 A2 | * | 12/2019 | ............. B23P 21/00 |
| WO | WO 2020/183026 | | 9/2020 | |

OTHER PUBLICATIONS

Machine translation of EP-3745224-A1 (Year: 2020).*
Machine translation of WO2019098429A1 (from google patents) (Year: 2019).*
Extended European Search Report for EP 22153505.7-1205, dated Jun. 7, 2022.

* cited by examiner

ROBOTIC MANUFACTURING SYSTEMS AND METHODS

RELATED APPLICATIONS

This application relates to and claims priority benefits from U.S. Provisional Patent Application No. 63/143,981, entitled "Robotic Manufacturing Systems and Methods," filed Feb. 1, 2021, which is hereby incorporated by reference in its entirety

FIELD OF THE DISCLOSURE

Embodiments of the present disclosure generally relate to robotic manufacturing systems and methods, such as robotic manufacturing systems and method that may be used to form portions of vehicles.

BACKGROUND OF THE DISCLOSURE

Various structures are formed and assembled by robots. Further, human operators often cooperate with robots in certain manufacturing settings. In particular, a cobot (that is, a collaborative robot) interacts with one or more humans in a workspace to form a structure. The cobot and human operator each perform certain defined tasks on the structure during a manufacturing process.

During the manufacturing process, one or more human operators perform condition-of-assembly checks on the structure to ensure proper and intended formation, assembly, and the like. As can be appreciated, manual condition-of-assembly checks are time-consuming and subject to human error. For example, a human typically walks around the structure being formed and compares the status of assembly to numerous (for example, hundreds or more) engineering drawings to ensure manufacturing integrity. Such a process generally works well for traditional automated assembly processes when a robot and human work independently from one another and are typically unable to disrupt the work of the other.

However, in cobotics, in which humans and robots work together, the working area that includes the structure, as well as the structure itself, often evolve and change over time. In such settings, a human operator may alter the structure to the point in which a cobot may no longer recognize the state of the structure, thereby causing quality non-conformance.

SUMMARY OF THE DISCLOSURE

A need exists for a system and a method for efficiently and effectively manufacturing a structure through a cobotic process. Further, a need exists for a system and a method for ensuring quality conformance of a structure formed through a robotic or cobotic process.

With those needs in mind, certain embodiments of the present disclosure provide a robotic manufacturing system including a robot including a control unit in communication with an operative member. The control unit is configured to operate the operative member in relation to a workpiece within a working area according to a control plan. A presence sensor is configured to detect presence of a human within the working area. An imaging device is configured to acquire an image of at least a portion of the workpiece in response to the presence sensor detecting the presence of the human within the working area.

In at least one embodiment, the control unit is further configured to: compare the image with reference data of the workpiece, continue operating the operative member according to the control plan if the image conforms to the reference data, and cease operating the operative member according to the control plan if the image does not conform to the reference data.

In at least one embodiment, the control unit is further configured to update the reference data based on at least one change between the image and the reference data. As a further example, the control unit is further configured to update the control plan after the reference data is updated.

As an example, the presence sensor is configured to detect the presence of the human within an operative area of the workpiece within the working area.

As an example, the robot includes one or both of the presence sensor or the imaging device. As another example, one or both of the presence sensor or the imaging device is remote from the robot within the working area.

In at least one embodiment, the imaging device is configured to acquire the image after the human is no longer within the working area.

In at least one embodiment, the imaging device is configured to acquire the image of the at least a portion of the workpiece in response to the presence sensor detecting the presence of the human within an operative area of the workpiece within the working area.

As an example, the robot further includes a conveyance that allows the robot to be mobile within the working area.

Certain embodiments of the present disclosure provide a robotic manufacturing method including; operating, by a control unit of a robot, an operative member of the robot in relation to a workpiece within a working area according to a control plan; detecting, by a presence sensor, presence of a human within the working area; and acquiring, by an imaging device, an image of at least a portion of the workpiece in response to the presence sensor detecting the presence of the human within the working area.

In at least one embodiment, the robotic manufacturing method also includes comparing, by the control unit, the image with reference data of the workpiece; continuing to operate, by the control unit, the operative member according to the control plan if the image conforms to the reference data; and ceasing to operate, by the control unit, the operative member according to the control plan if the image does not conform to the reference data.

In at least one embodiment, the robotic manufacturing method also includes updating, by the control unit, the reference data based on at least one change between the image and the reference data. In at least one further example, the robotic manufacturing method also includes updating, by the control unit, the control plan after the reference data is updated.

DETAILED DESCRIPTION OF THE DISCLOSURE

Figure 1:
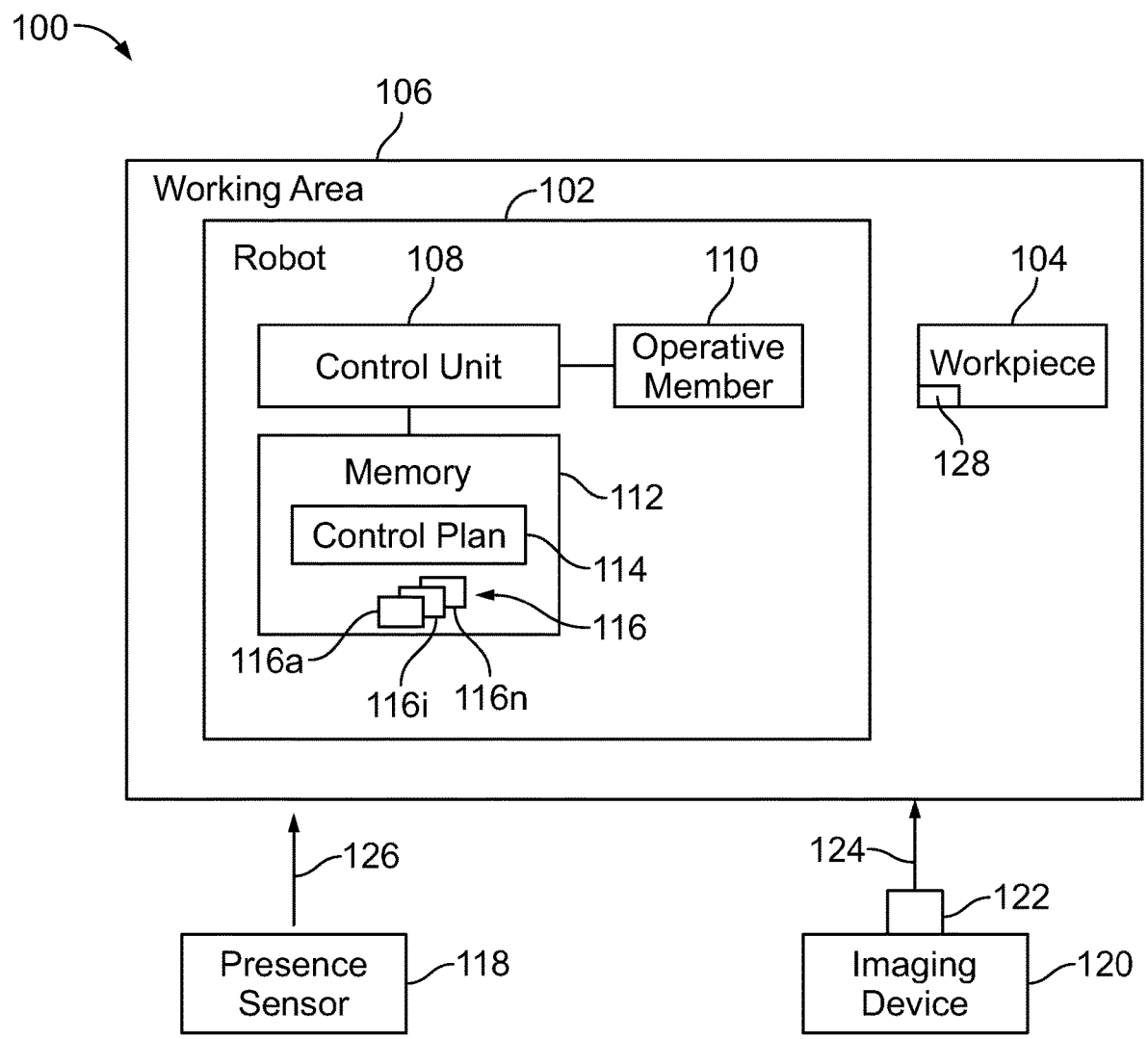
FIG. 1 illustrates a schematic block diagram of a robotic manufacturing system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a system and method for manufacturing a structure. The system and method include operating a robotic system within a working area and in accordance with a control plan for the robotic system. The system and method further include detecting, via a human presence detector, presence of a human in the working area. In response to detecting presence of the human, the system and method further include detecting, via a condition of assembly detector, a condition-of-assembly of the structure, comparing the detected condition-of-assembly to a prior condition-of-assembly to identify a condition-of-assembly change that occurred due to the presence of the human, and updating the control plan based on the identified condition-of-assembly change.

In at least one embodiment, the method can include populating a digital twin of the workpiece that indicates what the workpiece looks like before operation of the robotic system and invalidating the digital twin in response to detecting presence of the human. In at least one embodiment, the updating the control plan includes repopulating the digital twin based on the detected condition of assembly.

In at least one embodiment, invalidating the digital twin in response to detecting presence of the human and responsively updating the control plan can help avoid repair and/or rework that could otherwise occur based on the robot being unaware of changes made by human. Further, invalidating the digital twin in response to detecting presence of the human may also provide manufacture rate improvements, as the system and method can reduce or avoid continuously scanning the entire structure and updating the digital twin during operation.

Certain embodiments of the present disclosure provide a system and a method for robust teamed human/robot assembly in which robotics are augmented with human detectors. The system and method can use the presence of a human proximate to the workpiece as a signal to invalidate a robot digital twin and re-populate it with any changes the mechanic may have made while touching the workpiece, thereby ensuring that the digital twin reflects reality. As such, manufacturing quality is ensured. Further, the system and method save significant equipment downtime compared to traditional approaches that suffer from incorrect condition-of-assembly being unknown to automation equipment.

In at least one embodiment, a robot (such as a mobile cobot) maintains a digital twin of the state of the part during the manufacturing process. When the manufacturing process is semi-automated, there are tasks that are performed by mechanics before the robot operates, and other jobs that are performed by mechanics while the robot operates. For example, temporary fasteners can be installed before a robot drills in an associated area.

Cobotics coordinate people and robots for enhanced productivity, but this means that robots of such systems typically need to recognize what human operators have done. As such, certain embodiments of the present disclosure include robots augmented with a condition-of-assembly detector and a human approach detector. For example, the condition-of-assembly detector includes a camera (or other sensor) to determine if holes are drilled, filled, if brackets have been installed, and any other manufacturing requirement that needs to be verified. The human approach detector is able to determine when a person approaches the workpiece when the robot is working. The robot uses the condition-of-assembly detector to populate a digital twin of what the workpiece looks like before beginning operation. The robot can constantly monitor the human approach detector during the execution of the task. If triggered, the robot pauses, and invalidates the digital twin because the mechanic may have made changes, of which the robot may be unaware. After the person has left, before beginning work blindly like a normal robot, the digital twin (which may be empty, or uncertain and require updating) causes the condition-of-assembly detector to scan again, populate the digital twin, and automatically determine any changes to the robot program that need to be made, make them, and then resume work.

FIG. 1 illustrates a schematic block diagram of a robotic manufacturing system 100, according to an embodiment of the present disclosure. The robotic manufacturing system 100 includes a robot 102 that operates on a workpiece 104 within a working area 106. In at least one embodiment, the robotic manufacturing system 100 is a cobotic system in which the robot 102 and human operators each perform certain operations on the workpiece 104.

The robot 102 includes a control unit 108 in communication with an operative member 110 such as through one or more wired or wireless connections. The control unit 108 is also in communication with a memory 112, such as through one or more wired or wireless connections. In at least one embodiment, the control unit 108 includes the memory 112.

The control unit 108 operates the operative member 110 to perform operations on the workpiece 104 based on a control plan 114 stored in the memory 112. The control plan 114 includes or otherwise stores reference data 116 of the workpiece 104 through various stages of a manufacturing process. As examples, the reference data 116 can include image data, image transform data, and/or the like. In at least one example, the reference data 116 includes an image of a workpiece, which can be a digital twin of the workpiece. Such a digital twin can be invalidated, updated, and/or the like. The reference data 116 can be the same format, or a different format, as an image 122 acquired by an imaging device 120. In at least one example, the reference data 116 include initial reference data 116a associated with the workpiece 104 before any operations are performed thereon, final reference data 116*n* associated with the workpiece 104 after all manufacturing operations are performed thereon, and intermediate reference data 116*i* associated with various manufacturing stages between the initial reference data 116*a* and the final reference data 116*n*.

The workpiece 104 can be any structure that is configured to be formed through a robotic and/or cobotic process. For example, the workpiece 104 can be a structure of a vehicle. As a further example, the workpiece 104 can be a portion of a fuselage, wing, or the like of an aircraft. As another example, the workpiece 104 can be a structure that forms a portion of a fixed structure, such as a residential or commercial building.

The operative member 110 can be any component that is configured to perform an operation on the workpiece 104. For example, the operative member 110 can be a drill, saw, milling device, lathe, grappling arm, and/or the like. The operative member 110 can be disposed on an end effector, articulated arm, and/or the like of the robot 102.

The robotic manufacturing system 100 also includes a presence sensor 118 in communication with the control unit 108, such as through one or more wired or wireless connections. In at least one embodiment, the presence sensor 118 is disposed within the working area 106 remote from the robot 102. For example, the presence sensor 118 can be disposed on a boom, base, table, wall, ceiling, floor, or the like within the working area 106. As another example, the robot 102 includes the presence sensor 118.

The presence sensor 118 is configured to detect a presence of a human within the working area 106, and/or within a targeted area within the working area 106. For example, the presence sensor 118 is configured to detect a human being, such as through pattern recognition, machine learning, and/or the like. As an example, the presence sensor 118 is or includes an imaging device, such as a camera, infrared sensor, laser, ultrasonic detector, or the like that acquires images and determines if a human is within the image through recognizing patterns or images associated with human shapes, such as legs, torsos, and/or the like.

The robotic manufacturing system 100 also includes an imaging device 120 in communication with the control unit 108, such as through one or more wired or wireless connections. In at least one embodiment, the imaging device 120 is disposed within the working area 106 remote from the robot 102. For example, the imaging device 120 can be disposed on a boom, base, table, wall, ceiling, floor, or the like within the working area 106. As another example, the robot 102 includes the imaging device 120.

The imaging device 120 is configured to acquire an image of the workpiece 104. For example, the imaging device 120 acquires a plurality of images of the workpiece 104 during a manufacturing process. The imaging device 120 can be a camera, such as a digital camera, an infrared imaging device, a laser imaging device, an ultrasonic imaging device, and/or the like.

In operation, the workpiece 104 is initially set up, such as by one or more human operators positioning the workpiece 104 in the working area 106 where the robot 102 is able to operate on the workpiece 104. After the workpiece 104 is initially set up, the imaging device 120 acquires an image 122 of the workpiece 104. The control unit 108 receives image data 124 that includes the image 122 from the imaging device 120. The control unit 108 compares the image 122 to an associated reference data 116 (such as the initial reference data 116*a*), such as within the control plan 114. If the image 122 conforms to the associated reference data 116 during the particular stage of manufacturing, the control unit 108 operates the operative member 110 of the robot 102 according to the control plan 114 to perform one or more operations of the workpiece 104. If, however, the image 122 does not conform to the associated reference data 116, the control unit 108 invalidates the manufacturing process, and may discontinue operating on the workpiece 104. The imaging device 120 and the control unit 108 operate accordingly during an entire manufacturing process from the initial stage to the final stage.

During the manufacturing process, the presence sensor 118 monitors the working area 106 to determine if a human has entered the working area. If the presence sensor 118 detects the presence of a human, the presence sensor 118 outputs a presence signal 126 to the control unit 108. The presence signal 126 indicates the presence of a human within the working area 106.

In response to receipt of the presence signal 126, the control unit 108 ceases operating on the workpiece 104. The imaging device 120 acquires an image 122 of the workpiece 104 in response to the control unit 108 receiving the presence signal 126. For example, the image device 120 immediately acquires the image 122 after the control unit 108 receives the presence signal 126. As another example, the imaging device 120 acquires the image 122 after the control unit 108 determines that an individual is no longer present in the working area 106, based on the presence signal 126. For example, the imaging device 120 is configured to acquire the image after the human is no longer within the working area 106. Therefore, in at least one example, acquiring an image of at least a portion of the workpiece in response to the presence sensor detecting the presence of the human within the working area comprises waiting to acquire the image until after the detected individual is no longer present within the working area. For instance, acquiring an image of at least a portion of the workpiece in response to the presence sensor detecting the presence of the human within the working area may comprise, after detecting the presence of the human within the working area, the control unit determining that the human is no longer present within the working area and acquiring the image after determining that the human is no longer present within the working area. In this manner, the resulting image acquired by the imaging device 120 is reflective of any work performed by the individual while in the working area 106.

In at least one embodiment, in response to receipt of the presence signal 126, the control unit 108 may not alter a current control plan 114. For example, the robot 102 can execute a current control plan 114, when an individual enters the working area 106. However, the individual may be within a certain portion of the working area 106 that does not affect the control plan 114 with respect to another area of the working area 106. As such, the control unit 108 may operate the robot 102 to complete a particular portion of the current control plan 114 and continue to a subsequent portion of the control plan 114, in which the individual was detected by the presence sensor 118. As such, the reference data 116 may be invalid for the subsequent portion of the control plan 114, and the imaging device 120 may then acquire new images 122 of the workpiece 104, and the control plan 114 may then be updated accordingly.

In at least one embodiment, the image 122 is a digital twin of the workpiece 104. The control unit 108 receives the image data 124 including the image 122, which represents the workpiece 104 after the presence signal 126 has been received and the robot 102 ceased operating on the workpiece 104. The control unit 108 then compares the image 122 to an associated reference data 116 for the particular manufacturing stage. If the image 122 conforms to the associated reference data 116, the control unit 108 re-engages to operate on the workpiece 104. If, however, the image 122 does not conform to the associated reference data 116, the control unit 108 invalidates the manufacturing process and the robot 102 may not further operate on the workpiece 104. Instead, the control unit 108 updates the image 122 (for example, the digital twin of the workpiece 104) and/or one or more reference data 116 to include the changes that may have been made by the human operator, and updates the control plan 114 accordingly. Examples of the control unit 108 updating the image 122 include revising the image to include or remove features, or replacing a portion of the entirety of the image 122.

In at least one embodiment, the control unit 108 updates the image 122 before updating the control plan 114. In at least one other embodiment, the control unit 108 concurrently updates the image 122 and the control plan 114.

In at least one embodiment, the presence sensor 118 is configured to detect presence of a human within a targeted area of the working area 106. For example, the presence sensor 118 is configured to detect the presence of a human within an operative area 128 (such as within a 10 feet or less radius) of a particular operation on the workpiece 104. If the presence sensor 118 detects presence within the operative area 128, the control unit 108 ceases operation, and a comparison between the image 122 and the associated reference data 116 is made, as described herein. If, however, the presence sensor 118 does not detect presence within the operative area 128, the control unit 108 does not cease operation, even if presence is detected within the working area 106 outside of the operative area 128.

In at least one embodiment, the control unit 108 determines the operative area 128 with respect to the workpiece 104. The control unit 108 may determine the operative area 128 from data stored in the memory 112. In at least one embodiment, the control unit 108 may be triggered by the presence sensor, as described therein, only if presence is detected within the operative area 128. As such, subsequent operations (such as image acquisition) may be triggered if presence is detected with only a portion of the workpiece 104 (such as an area in which work is being performed), instead of an entirety of the workpiece 104.

As described, the robotic manufacturing system 100 includes the robot 102, which operates on the workpiece 104 within the working area 106 according to the control plan 114. The presence sensor 118 is configured to detect presence of a human in the working area 106. In response to detecting presence of the human, the imaging device 120 detects a condition-of-assembly of the workpiece 104, such as by acquiring the image 122 of the workpiece 104. The control unit 108 then compares the condition-of-assembly of the workpiece 104 (that is, the image 122) to a prior condition-of-assembly image, such as reference data 116, to identify a condition-of-assembly change that occurred due to the presence of the human. The control unit 108 can then update the control plan 114 based on the identified condition-of-assembly change.

In at least one embodiment, the image 122 acquired by the imaging device 120 is a digital twin of the workpiece 104. As an example, the digital twin indicates what the workpiece 104 looks like before an operational stage of the robot 102. In at least one embodiment, the control unit 108 invalidates the digital twin (for example, the image 122) in response to the presence sensor 118 detecting the presence of a human within the working area 106 and/or the operative area 128 of the working area 106.

In at least one embodiment, the control unit 108 updates the control plan 114 by the digital twin (such as by inserting operational areas, such as through-holes to be formed) based on the detected condition of assembly. For example, the control unit 108 can use the detected presence of a human as a signal to invalidate a robot digital twin and re-populate the digital twin with any changes the human may have made while touching the workpiece, thereby ensuring that the digital twin reflects reality.

As described herein, in at least one embodiment, the robotic manufacturing system 100 includes the robot 102, which includes the control unit 108 in communication with the operative member 110. The control unit 108 is configured to operate the operative member 110 in relation to the workpiece 104 within the working area 106 according to the control plan 114. The presence sensor 118 is configured to detect presence of a human within the working area 106. The imaging device 120 is configured to acquire the image 122 of at least a portion of the workpiece 104 in response to the presence sensor 118 detecting the presence of the human within the working area 106. The control unit 108 is further configured to compare the image 122 with reference data 116 of the workpiece 104. The control unit 108 is further configured to continue operating the operative member 110 according to the control plan 114 if the image 122 conforms to the reference data 116. The control unit 108 is further configured to cease operating the operative member 110 according to the control plan 114 if the image 122 does not conform to the reference data 116.

In at least one embodiment, the control unit 108 is further configured to repopulate one or both of the image 122 or the reference data 116 based on at least one change therebetween. For example, the control unit 108 updates the references data 116a, 116i, and/or 116n to reflect the change(s) (depending on the stage of manufacturing). The repopulated reference data 116a, 116i, and/or 116n provide revised and updated reference data 116 for the control plan 114. In at least one embodiment, the control unit 108 is further configured to update the control plan 114 (such as based on the updated references data 116) after one or both of the image 122 or the reference data 116 is updated.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation, as described herein.

The control unit 108 is configured to execute a set of instructions that are stored in one or more data storage units or elements (such as one or more memories), in order to process data. For example, the control unit 108 may include or be coupled to one or more memories. The data storage units may also store data or other information as desired or needed. The data storage units may be in the form of an information source or a physical memory element within a processing machine.

The set of instructions may include various commands that instruct the control unit 108 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
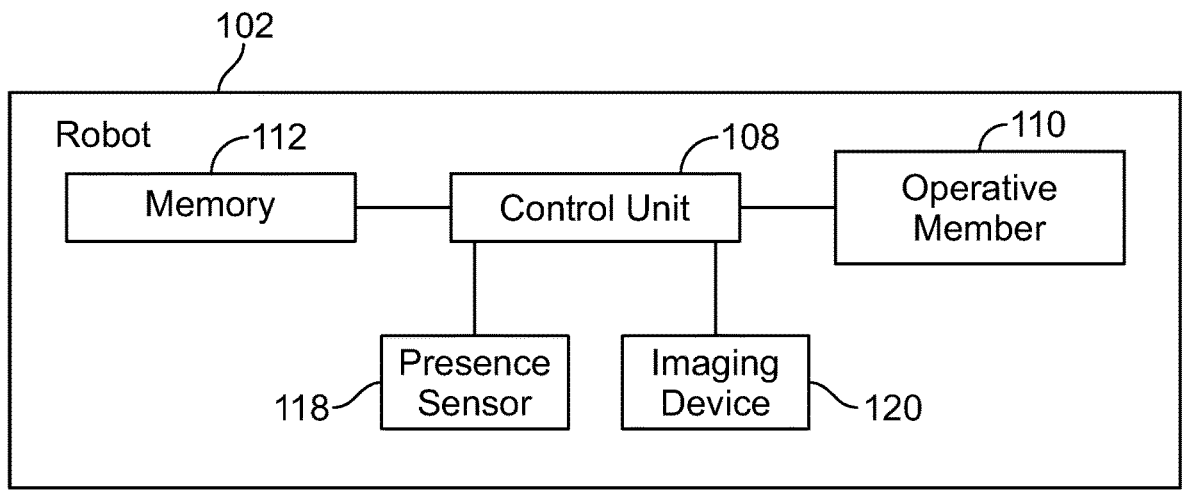
FIG. 2 illustrates a schematic block diagram of a robot, according to an embodiment of the present disclosure.

FIG. 2 illustrates a schematic block diagram of the robot 102, according to an embodiment of the present disclosure. Referring to FIGS. 1 and 2, in at least one embodiment, the robot 102 includes the presence sensor 118 and the imaging device 120. In at least one other embodiment, the robot 102 includes only one of the presence sensor 118 or the imaging device 120. In at least one other embodiment, the robot 102 does not include the presence sensor 118 or the imaging device 120.

Figure 3:
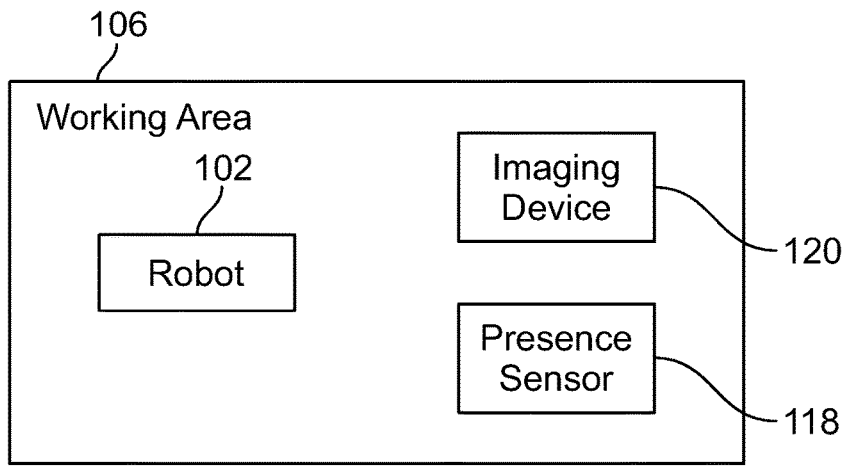
FIG. 3 illustrates a schematic block diagram of a working area, according to an embodiment of the present disclosure.

FIG. 3 illustrates a schematic block diagram of the working area 106, according to an embodiment of the present disclosure. Referring to FIGS. 1 and 2, in at least one embodiment, the robot 102 does not include the presence sensor 118 or the imaging device 120. Instead, in such an embodiment, the presence sensor 118 and the imaging device 120 are remote from the robot 102 within the working area 106.

Figure 4:
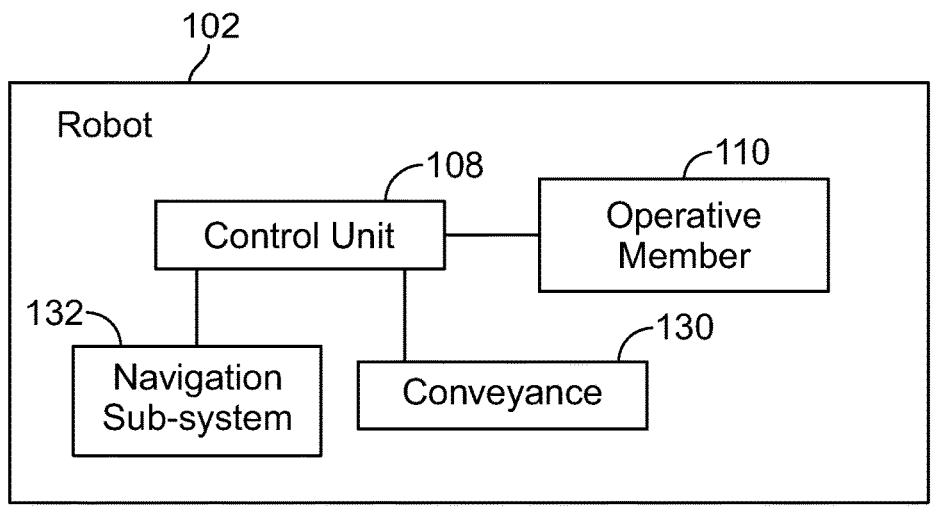
FIG. 4 illustrates a schematic block diagram of a robot, according to an embodiment of the present disclosure.

FIG. 4 illustrates a schematic block diagram of the robot 102, according to an embodiment of the present disclosure. In at least one embodiment, the robot 102 includes a conveyance 130 in communication with the control unit 108, such as through one or more wired or wireless connections. The conveyance 130 is a mobile platform that allows the robot 102 to move about the working area 106, thereby providing a mobile robot. For example, the conveyance 130 can include wheels, tracks, rollers, articulating legs, or the like.

In at least one embodiment, the robot 102 further includes a navigation sub-system 132 in communication with the control unit 108, such as through one or more wired or wireless connections. The navigation sub-system 132 allows the control unit 108 to know where the robot 102 is within the working area 106 (shown in FIG. 1) and operate the conveyance 130 to move the robot 102 to desired locations within the working area 106.

In at least one other embodiment, the robot 102 does not include the navigation sub-system 132 and/or the conveyance 130. Instead, the robot 102 can be fixed at a particular location, such as along an assembly line.

Figure 5:
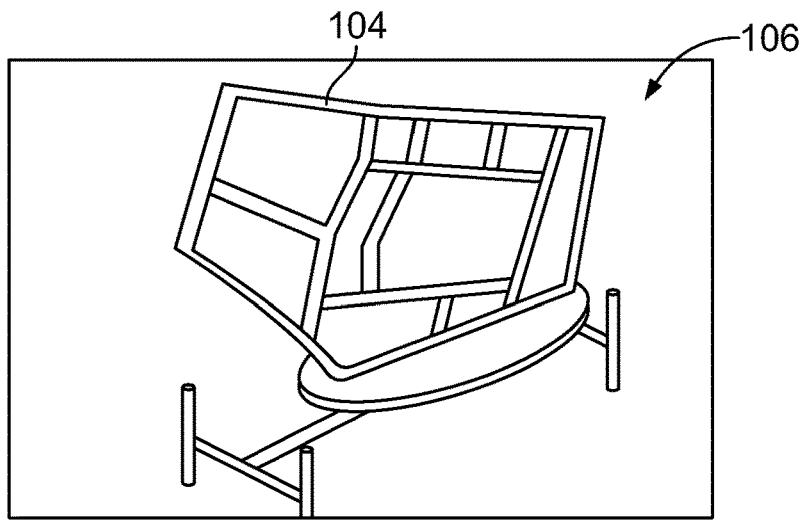
FIG. 5 illustrates a perspective view of a workpiece within a working area, according to an embodiment of the present disclosure.
Figure 6:
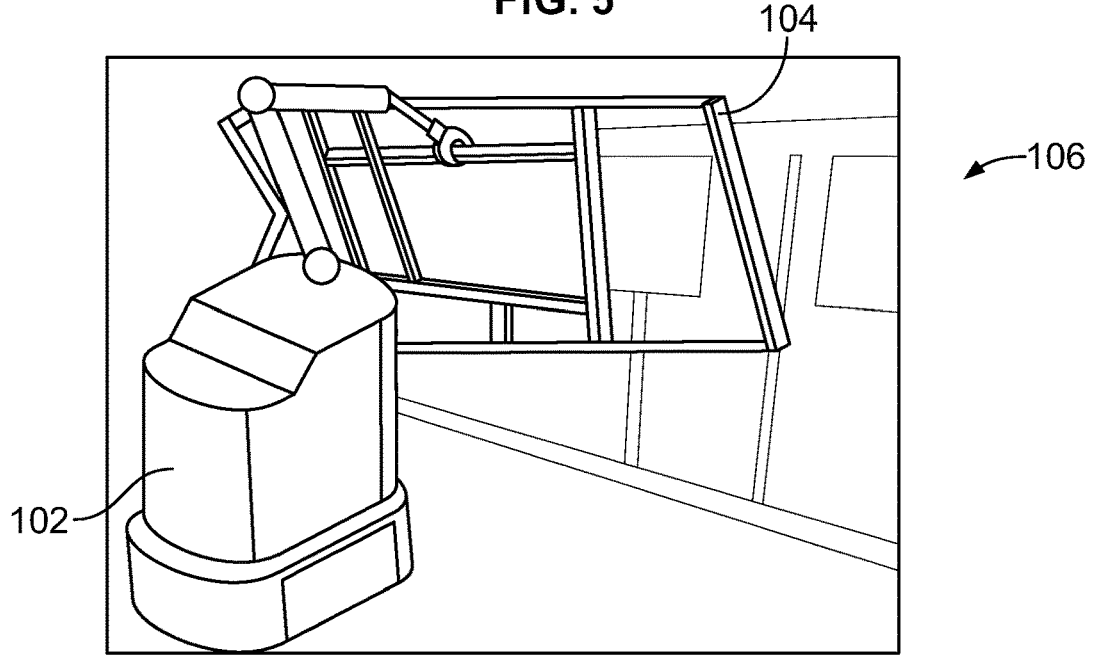
FIG. 6 illustrates a perspective view of a robot approaching the workpiece within the working area, according to an embodiment of the present disclosure.

FIG. 5 illustrates a perspective view of the workpiece 104 within the working area 106, according to an embodiment of the present disclosure. Referring to FIGS. 1 and 6, the workpiece 104 is initially set up in the working area 106, such as by one or more human operators. The workpiece 104 can be a frame member of a vehicle, for example.

FIG. 6 illustrates a perspective view of the robot 102 approaching the workpiece 104 within the working area 106, according to an embodiment of the present disclosure. Referring to FIGS. 1, 5, and 6, after the workpiece 104 is initially set up, the robot 102 approaches the workpiece 104 to operate thereon according to the control plan 114.

Figure 7:
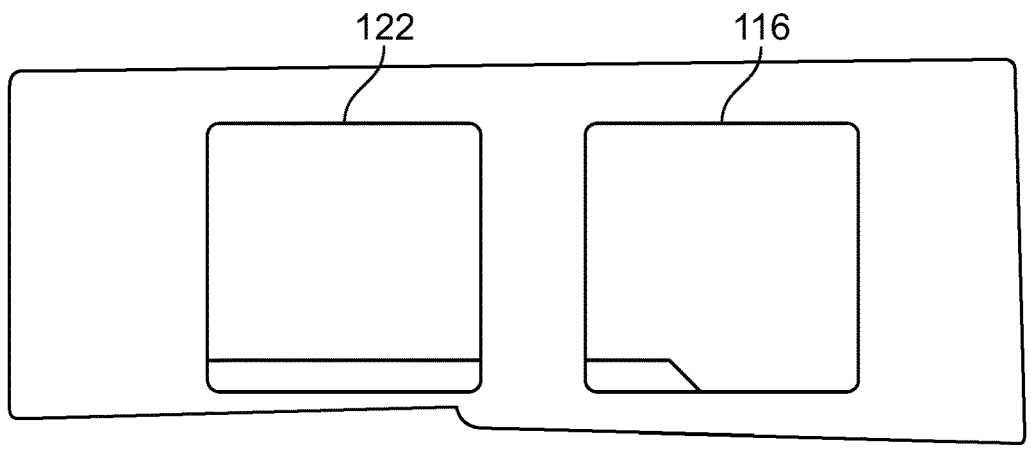
FIG. 7 illustrates a simplified view of an image of the workpiece and reference data of the workpiece, according to an embodiment of the present disclosure.

FIG. 7 illustrates a simplified view of an image 122 of the workpiece 104 and reference data 116 of the workpiece 104, according to an embodiment of the present disclosure. Referring to FIGS. 1, 5, 6, and 7, in response to the presence sensor 118 detecting the presence of a human within the working area 106 (and/or the operative area 128 of the working area 106), the imaging device 120 acquires the image 122 of the workpiece 104. The control unit 108 then ceases operation of the operative member 110. The control unit 108 then compares the image 122 to the reference data 116 at the particular stage of manufacturing. If the image 122 conforms to the reference data 116, the control unit 108 reactivates the operative member 110 to continue to operate on the workpiece 104 according to the control plan 114. If, however, the image 122 does not conform to the reference data 116, the control unit 108 invalidates the manufacturing process and can refrain from further operation on the workpiece 104. In at least one embodiment, in response to the image 122 not conforming to the reference data 116, the control unit 108 repopulates the image 122 based on the changes made to the workpiece 104 (for example, additional through-holes formed in the workpiece 104, as reflected in the image 122), which is a digital twin of the workpiece 104 as currently existing. The control unit 108 updates the control plan 114 and reference data 116 accordingly, and continues to operate the operative member 110 based on the updated control plan 114.

Figure 8:
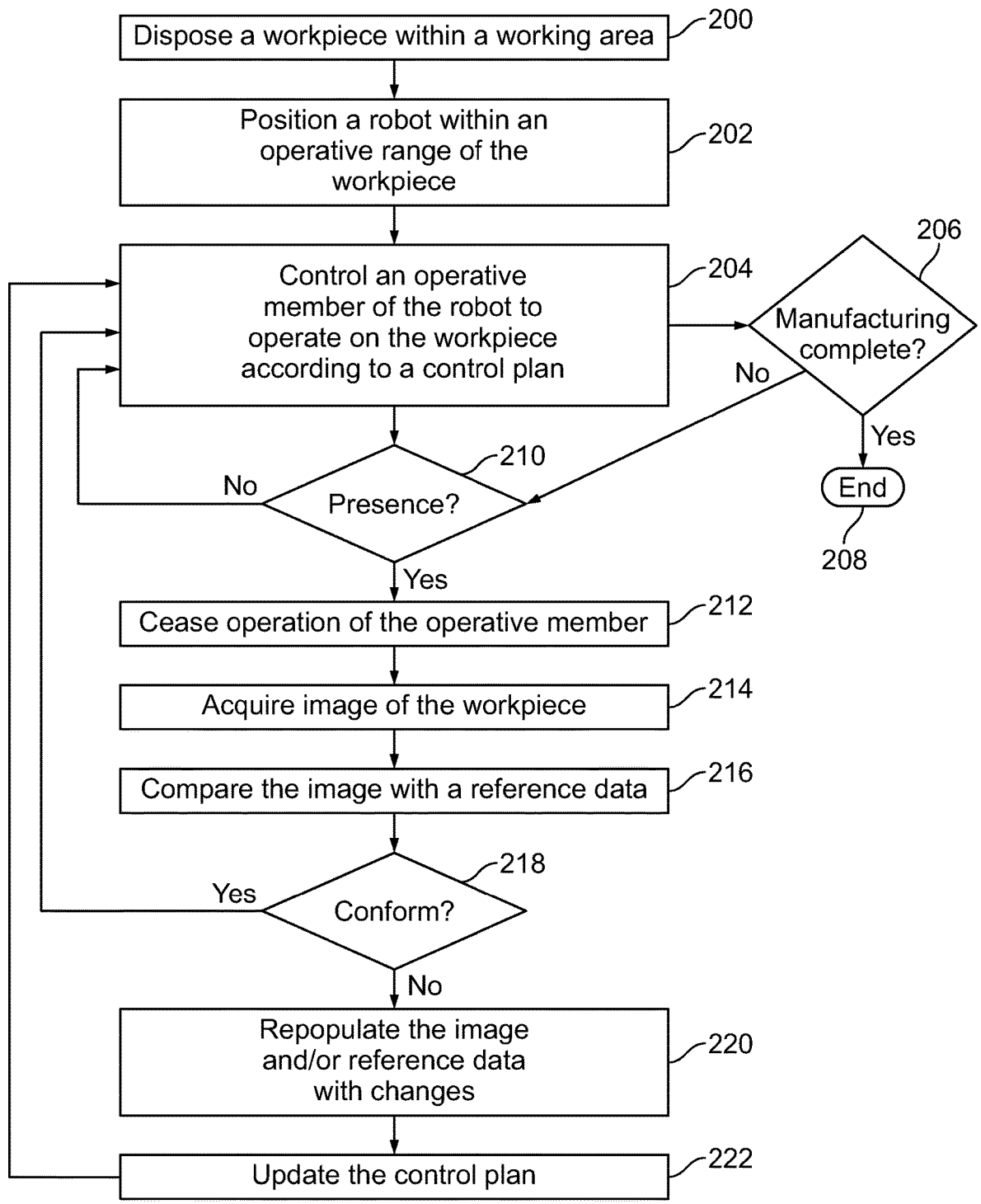
FIG. 8 illustrates a flow chart of a robotic manufacturing method, according to an embodiment of the present disclosure.

FIG. 8 illustrates a flow chart of a robotic manufacturing method, according to an embodiment of the present disclosure. Referring to FIGS. 1 and 8, the robotic manufacturing method includes disposing, at 200, the workpiece 104 within the working area 106. Next, at 202, the robot 102 is positioned within an operative range of the workpiece 104. The operative range is the range in which the operative member 110 is able to operate on the workpiece 104.

At 204, the control unit 108 controls the operative member 110 of the robot 102 to operate on the workpiece 104 according to the control plan 114. At 206, the control unit 108 determines (based on the control plan 114) if the manufacturing process is complete. If the manufacturing process is complete, the robotic manufacturing method ends at 208.

If, however, the manufacturing process is not complete at 206, the method proceeds to 210, at which the presence sensor 118 detects whether or not a human is within the working area 106 (and or the operative area 128 of the workpiece 104). If presence is not detected, the method returns to 204.

If, however, presence is detected, the robotic manufacturing method proceeds from 210 to 212, at which the control unit 108 ceases operation of the operative member 110. Next, at 214, the imaging device 120 acquires the image 122 of the workpiece 104 after detection of presence of a human. At 216, the control unit 108 compares the image 122 with reference data 116 stored in the memory 112. The reference data 116 corresponds to a current stage of manufacturing, as determined by the control unit 108.

At 218, the control unit 108 determines if the image 122 conforms to the reference data 116. If the image 122 conforms to the reference data 116, the method returns to 204.

If, however, the control unit 108 determines that the image 122 does not conform to the reference data 116 at 218 (such as by additional through-holes, cuts, and/or the like being formed in the workpiece 104), the method proceeds from 218 to 220, at which the control unit 108 repopulates the image 122 and/or the reference data 116 with the detected changes. Next, at 222, the control unit 108 updates the control plan 114 based on the detected changes, and the method returns to 204.

Optionally, after 222, in order to continue the operation of the robot, human collaboration may be necessary. For example, foreign object debris may be present. An individual may need to remove such foreign object debris. As such, after the control plan is updated at 222, the operation may cease until further steps are taken, such as by individuals.

Figure 9:
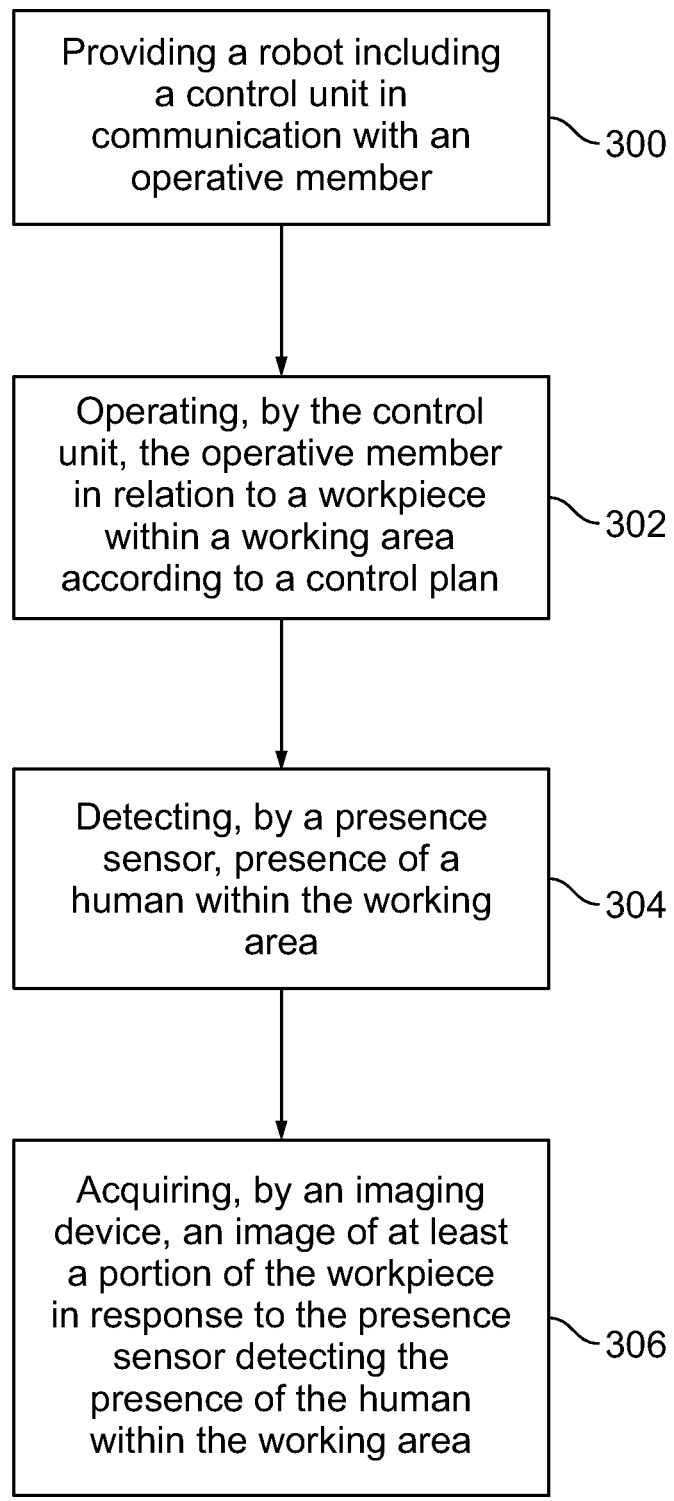
FIG. 9 illustrates a flow chart of a robotic manufacturing method, according to an embodiment of the present disclosure.

FIG. 9 illustrates a flow chart of a robotic manufacturing method, according to an embodiment of the present disclosure. Referring to FIGS. 1 and 9, the robot manufacturing method includes providing, at 300, a robot 102 including a control unit 108 in communication with an operative member 110; operating, at 302, by the control unit 108, the operative member 110 in relation to a workpiece 104 within a working area 106 according to a control plan 114; detecting, at 304, by a presence sensor 118, presence of a human within the working area 106; and acquiring, at 306, by an imaging device 120, an image 122 of at least a portion of the workpiece 104 in response to the presence sensor 118 detecting the presence of the human within the working area 106.

In at least one embodiment, the robotic manufacturing method further includes comparing, by the control unit 108, the image 122 with reference data 116 of the workpiece 104; continuing to operate, by the control unit 108, the operative member 110 according to the control plan 114 if the image 122 conforms to the reference data 116; and ceasing to operate, by the control unit 108, the operative member 110 according to the control plan 114 if the image 122 does not conform to the reference data 116.

In at least one embodiment, the robotic manufacturing method further includes updating, by the control unit 108, the reference data 116 based on at least one change between the image 122 and the reference data 116.

In at least one embodiment, the robotic manufacturing method further includes updating, by the control unit 108, the control plan 114 after the reference data 116 is updated.

As a further example, said detecting includes detecting, by the presence sensor 118, the presence of the human within an operative area 128 of the workpiece 104 within the working area 106.

As an example, the robotic manufacturing method also includes disposing one of the presence sensor 118 or the imaging device 120 on or within the robot 102. As another example, the robotic manufacturing method also includes disposing the presence sensor 118 and the imaging device 120 on or within the robot 102. As another example, the robotic manufacturing method includes remotely locating one or both of the presence sensor 118 or the imaging device 120 from the robot 102 within the working area 106.

As an example, the robotic manufacturing method also includes moving the robot 102 within the working area 106 with a conveyance 130 (shown in FIG. 4).

Further, the disclosure comprises embodiments according to the following clauses:

Clause 1. A robotic manufacturing system comprising:
a robot including a control unit in communication with an operative member, wherein the control unit is configured to operate the operative member in relation to a workpiece within a working area according to a control plan;
a presence sensor configured to detect presence of a human within the working area; and
an imaging device configured to acquire an image of at least a portion of the workpiece in response to the presence sensor detecting the presence of the human within the working area.

Clause 2. The robotic manufacturing system of Clause 1, wherein the control unit is further configured to:
compare the image with reference data of the workpiece,
continue operating the operative member according to the control plan if the image conforms to the reference data, and
cease operating the operative member according to the control plan if the image does not conform to the reference data.

Clause 3. The robotic manufacturing system of Clause 2, wherein the control unit is further configured to update the reference data based on at least one change between the image and the reference data.

Clause 4. The robotic manufacturing system of Clause 3, wherein the control unit is further configured to update the control plan after the reference data is updated.

Clause 5. The robotic manufacturing system of any of Clauses 1-4, wherein the presence sensor is configured to detect the presence of the human within an operative area of the workpiece within the working area.

Clause 6. The robotic manufacturing system of any of Clauses 1-5, wherein the robot comprises one or both of the presence sensor or the imaging device.

Clause 7. The robotic manufacturing system of any of Clauses 1-6, wherein the imaging device is configured to acquire the image after the human is no longer within the working area.

Clause 8. The robotic manufacturing system of any of Clauses 1-7, wherein the imaging device is configured to acquire the image of the at least a portion of the workpiece in response to the presence sensor detecting the presence of the human within an operative area of the workpiece within the working area.

Clause 9. The robotic manufacturing system of any of Clauses 1-8, wherein one or both of the presence sensor or the imaging device is remote from the robot within the working area.

Clause 10. The robotic manufacturing system of any of Clauses 1-9, wherein the robot further comprises a conveyance that allows the robot to be mobile within the working area.

Clause 11. A robotic manufacturing method comprising:

operating, by a control unit of a robot, an operative member of the robot in relation to a workpiece within a working area according to a control plan;

detecting, by a presence sensor, presence of a human within the working area; and acquiring, by an imaging device, an image of at least a portion of the workpiece in response to the presence sensor detecting the presence of the human within the working area.

Clause 12. The robotic manufacturing method of Clause 11, further comprising:

comparing, by the control unit, the image with reference data of the workpiece;

continuing to operate, by the control unit, the operative member according to the control plan if the image conforms to the reference data; and ceasing to operate, by the control unit, the operative member according to the control plan if the image does not conform to the reference data.

Clause 13. The robotic manufacturing method of Clause 12, further comprising updating, by the control unit, the reference data based on at least one change between the image and the reference data.

Clause 14. The robotic manufacturing method of Clause 13, further comprising updating, by the control unit, the control plan after the reference data is updated.

Clause 15. The robotic manufacturing method of any of Clauses 11-14, wherein said detecting comprises detecting, by the presence sensor, the presence of the human within an operative area of the workpiece within the working area.

Clause 16. The robotic manufacturing method of any of Clauses 11-15, wherein said acquiring comprises acquiring the image after the human is no longer within the working area.

Clause 17. The robotic manufacturing method of any of Clauses 11-16, wherein said acquiring comprises acquiring the image of the at least a portion of the workpiece in response to the presence sensor detecting the presence of the human within an operative area of the workpiece within the working area.

Clause 18. The robotic manufacturing method of any of Clauses 11-17, further moving the robot within the working area with a conveyance.

Clause 19. A robotic manufacturing system comprising:

a robot including:

a control unit in communication with an operative member, wherein the control unit is configured to operate the operative member in relation to a workpiece within a working area according to a control plan;

a presence sensor configured to detect presence of a human within the working area and an operative area of the workpiece within the working area; and an imaging device configured to acquire an image of at least a portion of the workpiece in response to the presence sensor detecting the presence of the human within the working area, wherein the control unit is further configured to:

compare the image with reference data of the workpiece, cease operating the operative member according to the control plan if the image does not conform to the reference data, update the reference data based on at least one change between the image and the reference data, and update the control plan after the reference data is updated.

Clause 20. The robotic manufacturing system of Clause 19, wherein the robot further comprises a conveyance that allows the robot to be mobile within the working area.

As described herein, certain embodiments of the present disclosure provide systems and methods for efficiently and effectively manufacturing a structure through a robotic process, such as a cobotic process. Further, certain embodiments of the present disclosure provide systems and methods for ensuring quality conformance of a structure formed through a robotic or cobotic process.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A robotic manufacturing system comprising:
a robot including a control unit including one or more processors in communication with an operative member, wherein the control unit is configured to operate the operative member in relation to a workpiece within a working area according to a control plan;
a presence sensor configured to detect presence of a human within the working area; and
an imaging device configured to acquire an image of at least a portion of the workpiece in response to the presence sensor detecting the presence of the human within the working area, wherein the imaging device is configured to acquire the image after the human is no longer within the working area.

2. The robotic manufacturing system of claim 1, wherein the control unit is further configured to:
compare the image with reference data of the workpiece,
continue operating the operative member according to the control plan if the image conforms to the reference data, and
cease operating the operative member according to the control plan if the image differs from the reference data.

3. The robotic manufacturing system of claim 2, wherein the control unit is further configured to update the reference data based on at least one change between the image and the reference data.

4. The robotic manufacturing system of claim 3, wherein the control unit is further configured to update the control plan after the reference data is updated.

5. The robotic manufacturing system of claim 1, wherein the presence sensor is configured to detect the presence of the human within an operative area of the workpiece within the working area.

6. The robotic manufacturing system of claim 1, wherein the robot comprises one or both of the presence sensor or the imaging device.

7. The robotic manufacturing system of claim 1, wherein the imaging device is configured to acquire the image of the at least a portion of the workpiece in response to the presence sensor detecting the presence of the human within an operative area of the workpiece within the working area.

8. The robotic manufacturing system of claim 1, wherein one or both of the presence sensor or the imaging device is remote from the robot within the working area.

9. The robotic manufacturing system of claim 1, wherein the robot further comprises a conveyance that allows the robot to be mobile within the working area.

10. The robotic manufacturing system of claim 1, wherein the imaging device is configured to immediately acquire an initial image of at least a portion of the workpiece in response to the presence sensor detecting the presence of the human within the working area, wherein the initial image is acquired before the image.

11. The robotic manufacturing system of claim 1, wherein the control unit is configured to cease operating the operative member in response to the presence sensor detecting the presence of the human within the working area.

12. A robotic manufacturing method comprising:
operating, by a control unit including one or more processors of a robot, an operative member of the robot in relation to a workpiece within a working area according to a control plan;
detecting, by a presence sensor, presence of a human within the working area; and
acquiring, by an imaging device, an image of at least a portion of the workpiece in response to the presence sensor detecting the presence of the human within the working area, wherein said acquiring comprises acquiring the image after the human is no longer within the working area.

13. The robotic manufacturing method of claim 12, further comprising:
comparing, by the control unit, the image with reference data of the workpiece;
continuing to operate, by the control unit, the operative member according to the control plan if the image conforms to the reference data; and
ceasing to operate, by the control unit, the operative member according to the control plan if the image differs from the reference data.

14. The robotic manufacturing method of claim 13, further comprising updating, by the control unit, the reference data based on at least one change between the image and the reference data.

15. The robotic manufacturing method of claim 14, further comprising updating, by the control unit, the control plan after the reference data is updated.

16. The robotic manufacturing method of claim 12, wherein said detecting comprises detecting, by the presence sensor, the presence of the human within an operative area of the workpiece within the working area.

17. The robotic manufacturing method of claim 12, wherein said acquiring comprises acquiring the image of the at least a portion of the workpiece in response to the presence sensor detecting the presence of the human within an operative area of the workpiece within the working area.

18. The robotic manufacturing method of claim 12, further comprising moving the robot within the working area with a conveyance.

19. A robotic manufacturing system comprising:
a robot including:
a control unit including one or more processors in communication with an operative member, wherein the control unit is configured to operate the operative member in relation to a workpiece within a working area according to a control plan;
a presence sensor configured to detect presence of a human within the working area and an operative area of the workpiece within the working area; and
an imaging device configured to acquire an image of at least a portion of the workpiece in response to the presence sensor detecting the presence of the human within the working area, wherein the imaging device is configured to acquire the image after the human is no longer within the working area, and
wherein the control unit is further configured to:
compare the image with reference data of the workpiece,
cease operating the operative member according to the control plan if the image differs from the reference data,
update the reference data based on at least one change between the image and the reference data, and
update the control plan after the reference data is updated.

20. The robotic manufacturing system of claim 19, wherein the robot further comprises a conveyance that allows the robot to be mobile within the working area.

21. The robotic manufacturing system of claim 19, wherein the imaging device is configured to immediately acquire an initial image of at least a portion of the workpiece in response to the presence sensor detecting the presence of the human within the working area, wherein the initial image is acquired before the image.

22. The robotic manufacturing system of claim 19, wherein the control unit is configured to cease operating the operative member in response to the presence sensor detecting the presence of the human within the working area.

* * * * *